United States Patent [19]
Yeh

[11] Patent Number: 5,867,413
[45] Date of Patent: *Feb. 2, 1999

[54] FAST METHOD OF FLOATING-POINT MULTIPLICATION AND ACCUMULATION

[75] Inventor: Hsueh-Li Joseph Yeh, Cupertino, Calif.

[73] Assignee: Hitachi Micro Systems, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 544,159

[22] Filed: Oct. 17, 1995

[51] Int. Cl.$^6$ ........................................ G06F 7/38
[52] U.S. Cl. ........................ 364/748.07; 364/748.11
[58] Field of Search ............... 364/715.04, 736, 364/745, 748, 750.5, 754, 757, 768, 770, 784, 786, 788, 748.07, 748.11

[56] References Cited

U.S. PATENT DOCUMENTS

| | | | |
|---|---|---|---|
| 4,969,118 | 11/1990 | Montoye et al. | 364/748 |
| 5,103,419 | 4/1992 | Toyokura et al. | 364/750.5 |
| 5,241,493 | 8/1993 | Chu et al. | 364/748 |
| 5,375,079 | 12/1994 | Uramoto et al. | 364/736 |
| 5,471,410 | 11/1995 | Bailey et al. | 364/748 X |
| 5,504,698 | 4/1996 | Su | 364/768 |
| 5,550,767 | 8/1996 | Taborn et al. | 364/745 |

OTHER PUBLICATIONS

Article by Montoye et al. entitled "Design of the IBM RISC System/6000 Floating–point Execution Unit" published by IBM J. Res. Develop., vol. 34, No. 1 Jan. 1990, pp. 59–70.

Primary Examiner—Chuong Dinh Ngo
Attorney, Agent, or Firm—Graham & James LLP

[57] ABSTRACT

A fast floating-point multiplication and accumulation unit (fmac) is described. The described fmac uses significantly less hardware, thereby yielding a fast and an inexpensive fmac. This fmac uses an m-bit carry propagation adder instead of a 3 m-bit carry propagation adder and a 2 m-bit normalizer instead of a 3 m-bit normalizer. The normalizer relies on a leading one detection, as opposed to leading one/zero prediction used in known fmac's. Even when the product of the multiplication is opposite in sign to the number added to the product, the fmac, disclosed here, only uses an m-bit adder and a 2 m-bit normalizer.

4 Claims, 6 Drawing Sheets

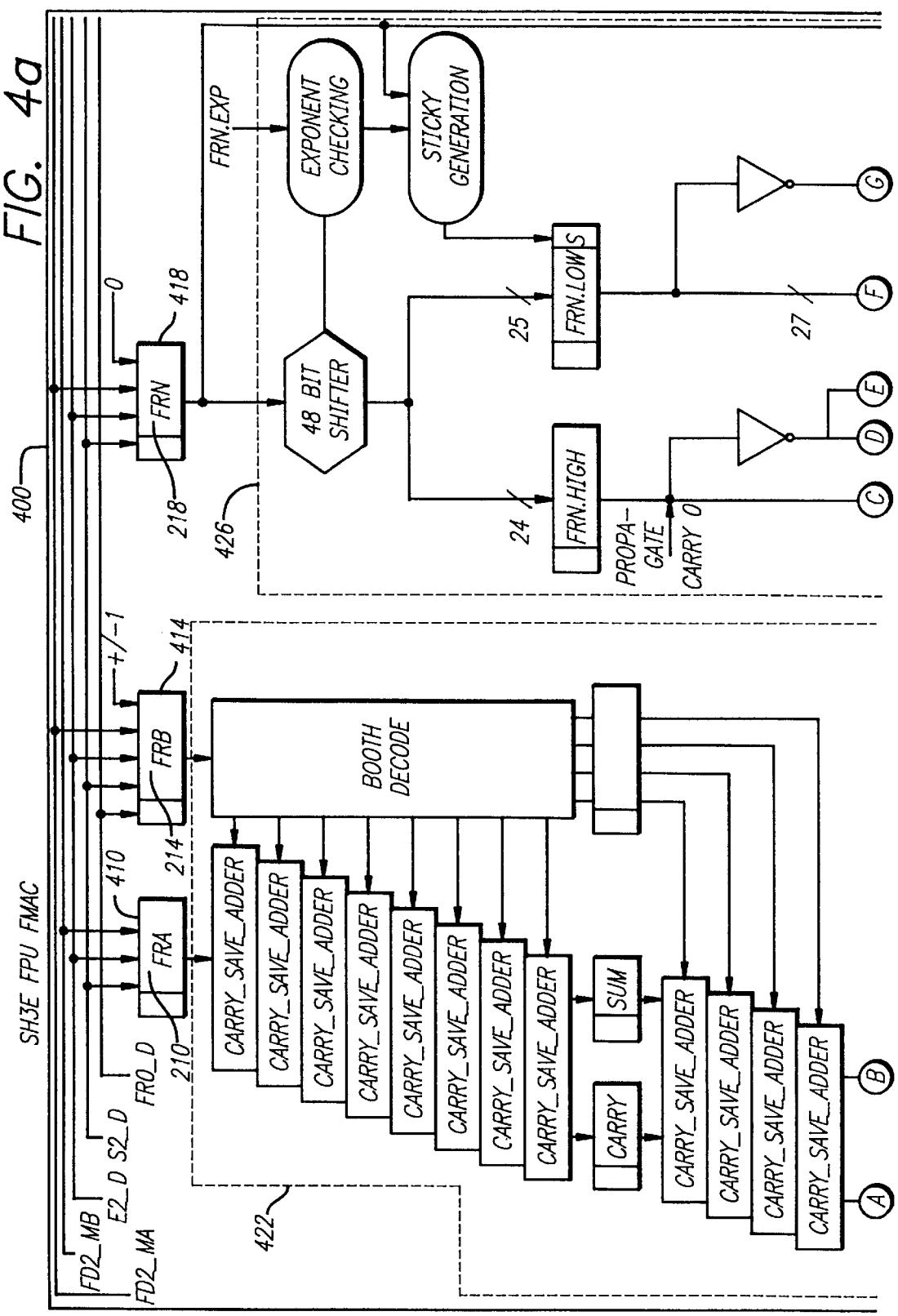

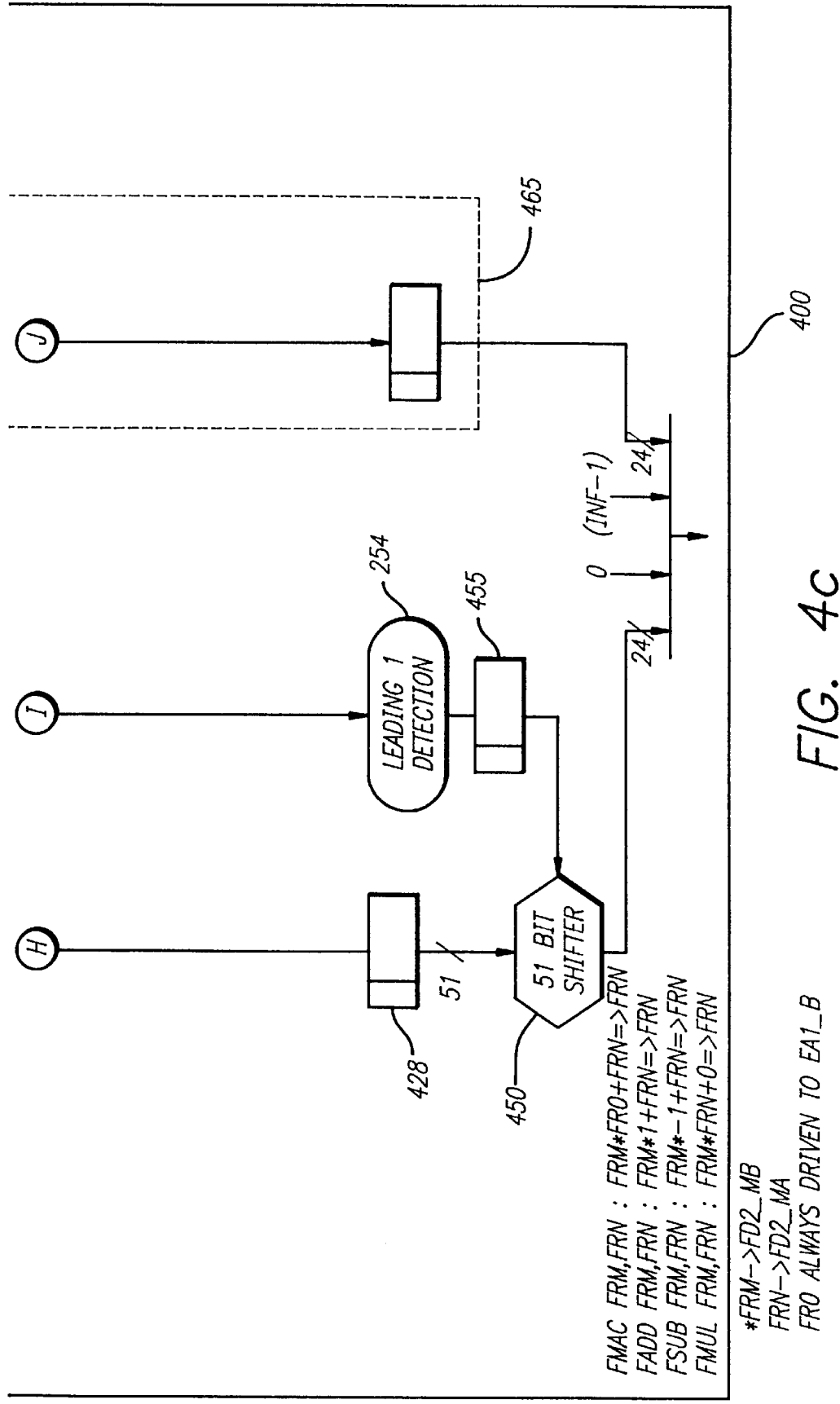

FAST METHOD OF FLOATING-POINT MULTIPLICATION AND ACCUMULATION

BACKGROUND OF THE INVENTION

1. Field of the Invention

The present invention relates to floating-point multiplication and accumulation. More particularly, but without limitation, the present invention relates to floating-point multiplication and accumulation units (fmac) that perform floating-point multiplication and accumulation operations, such as (A×B)+C, with significant temporal overlap of suboperations, as explained below.

2. Description of Related Art

Typically, an fmac is a part of a floating-point unit of a microprocessor. An fmac generally performs as one operation floating-point multiplication and accumulation operations, such as (A×B)+C. In microprocessor design, fmac's play an important role in, for example, graphics applications. Basically, fmac's reduce the instruction path length by combining two instructions into one. Graphics applications often involve coordinate transformations, which are implemented as matrix transformations. By performing (A×B)+C as a single functional operation instead of a separate multiplication and addition, an fmac can increase the speed with which such matrix transformations are performed. For instance, when running at peak condition, an fmac can perform floating-point operations faster by a factor of two, compared to a unit performing separately the addition and multiplication in the operations (A×B)+C.

FIG. 1 illustrates a prior art fmac design. In FIG. 1, a binary floating-point number, A 110, is multiplied by another binary floating-point number, B 114. The result of this multiplication is then added to another binary floating-point number, C 118. A floating-point number includes a sign, a signed exponent, and a mantissa. FIG. 1 illustrates the case of A 110, B 114, and C 118, being m-bit numbers, i.e, each having an m-bit mantissa.

In this prior art design, the multiplication of A 110 and B 114, is performed using a multiplication array 122. The multiplication array 122 produces the partial products formed by multiplying, for instance, the mantissa of A 110 by each digit of the mantissa of B 114. The result of the multiplication can be up to a 2 m-bit number, since A 110 and B 114 are m-bit numbers. While the multiplication of A 110 and B 114 is occurring, C's 118 mantissa is pre-normalized 126. The pre-normalization 126 of C's 118 mantissa brings into agreement the exponent of C 118 with the exponent of the product of A 110 and B 114.

Next, a 3 m-bit carry propagation adder 130 adds the product of the multiplication of A 110 and B 114, to the pre-normalized number C 118. The more bit positions an adder has to process, the slower it operates and the more hardware it requires to implement. Nevertheless, this prior art design employs a 3 m-bit CPA 130, because conceivably each bit of the mantissa of C 118 is more significant than any of the bits of the 2 m-bit mantissa of the product of A 110 and B 114. Therefore, an adder adding the normalized C 118 to the product of A 110 and B 114, requires a capacity to handle a 3 m-bit wide mantissa 134.

In parallel with the addition performed by the 3 m-bit adder 130, a leading one/zero anticipator 138 operates on the numbers which are being added by the adder 130 to predict the bit position of the most significant bit of the number resulting from the addition. Actually, a leading one detector is less hardware intensive and faster than the leading one/zero anticipator 138 and also error free unlike the anticipator 138, as explained below. However, this prior art fmac uses the anticipator 138, because it needs to find the most significant bit of the output of the adder 130, while the adder 130 is executing, i.e. in parallel with the addition performed by the adder 130.

The leading one/zero anticipator 138 predicts the location of the most significant one bit in the result of the addition, if the result is positive, and of a leading zero if the result is negative. Predicting the leading zero can result in an error of the most significant bit being predicted one bit position too far to the right. For instance, the anticipator 138 may predict the leading zero of a negative number to appear in the fifth position from the left, but due to a carry generated when taking the twos complement of the negative number, the actual most significant bit ends up being in the fourth position from the left.

Next, the 3 m-bit mantissa output of the 3 m-bit adder 130 is normalized by a 3 m-bit normalizer 142. The normalizer 142 keeps up to m of the most significant bits and discards up to 2 m of the least significant bits of the 3 m-bit mantissa output of the CPA 130. Only an m-bit mantissa is kept, which may have up to m significant bits. In performing the normalization 142, this fmac uses the prediction of the leading one/zero anticipator 138 to determine the position of the most significant bit in the 3 m-bit mantissa output of the 3 m-bit adder 130.

If the m-bit output of the normalizer 142 is negative, then the prior art design of FIG. 1 requires taking the twos complement of the normalized 142 3 m-bit number. To generate the twos complement, the result of the normalization 142 is inverted (not shown) and incremented 146 (that is, the incrementer 146 adds a one to the m-bit number, which is output by the normalizer 142). Then, in some cases, when there is the error in the prediction of the most significant bit position, as explained above, this prior art design applies a binary shift 150 to the m-bit mantissa of the output of the incrementer 146. When activated, the binary shifter 150 shifts the m-bit mantissa to the right by one bit and adds a one to the exponent of the m-bit floating-point number.

Following step 150, the result 154 of the operations (A×B)+C is available. The total execution time for this prior art fmac design is approximately the time needed for executing the following: (m-bit×m-bit multiplication)+(3 m-bit addition)+(3 m-bit normalization)+(m-bit increment)+(binary shift).

SUMMARY OF THE INVENTION

This invention provides a process and a system for operating on the multiplication product of a first binary number and a second binary number, and for operating on a third binary number. In particular, this invention provides for a fast, simple, and inexpensive floating-point multiplication and accumulation unit for floating-point multiplication and accumulation operations, such as (A×B)+C.

From a system standpoint, a preferred embodiment of the invention comprises a first device for storing a first higher part of the third number. Further, there is a second device for storing a lower part of the third number. A first adder operates on the lower part of the third number and the product to generate a first result. Finally, this preferred embodiment comprises a third device for combining the first higher part with the first result to produce a second result.

A preferred embodiment of this invention only uses an m-bit carry propagation adder (CPA), instead of a 3 m-bit CPA, as does a prior art design. Moreover, this embodiment uses a leading one detector as opposed to a leading one/zero anticipator.

Using an m-bit CPA instead of a 3 m-bit CPA reduces significantly the hardware required to implement this fmac of this preferred embodiment. In addition, using an m-bit CPA instead of a 3 m-bit CPA, also significantly increases the speed with which the result of the addition is available, since the time for computing a sum is dominated by the bit width of the mantissas' of the numbers added.

Because, in this embodiment, this fmac uses a leading one detector (as opposed to a leading one anticipator), a binary shifter is unnecessary for correcting an error in the prediction of the most significant bit position. The reason is that the leading one detector determines the exact location of the most significant one. Unlike an anticipator, the leading one detector operates on a bit string that is already in existence. The leading one anticipator, in contrast, merely attempts to predict the position of the most significant bit with a possible error of one position. In a prior art design, a binary shifter is used to correct that possible error.

Implementing the leading one detector requires significantly less hardware than implementing a leading one anticipator. Furthermore, leading one detectors are significantly faster than leading one/zero anticipators.

Moreover, a preferred embodiment of the present invention only normalizes a 2 m-bit mantissa as opposed to a 3 m-bit mantissa, as in a prior art design. Consequently, the normalizer in this preferred embodiment is less hardware intensive and faster than the normalizer of the prior art design.

From a process standpoint, a preferred embodiment of the invention comprises the following steps of operating on first, second, and third numbers. Using a pre-normalizer, the third number is divided into a first higher part and a lower part. The lower part and the product are operated on with an adder to generate a first result. The first higher part is combined in memory with the first result to produce a second result.

BRIEF DESCRIPTION OF THE FIGURES

FIGS. 4a, 4b and 4c are a circuit of a preferred embodiment of a floating-point multiplication and accumulation unit.

DETAILED DESCRIPTION OF PREFERRED EMBODIMENTS

Figure 1:
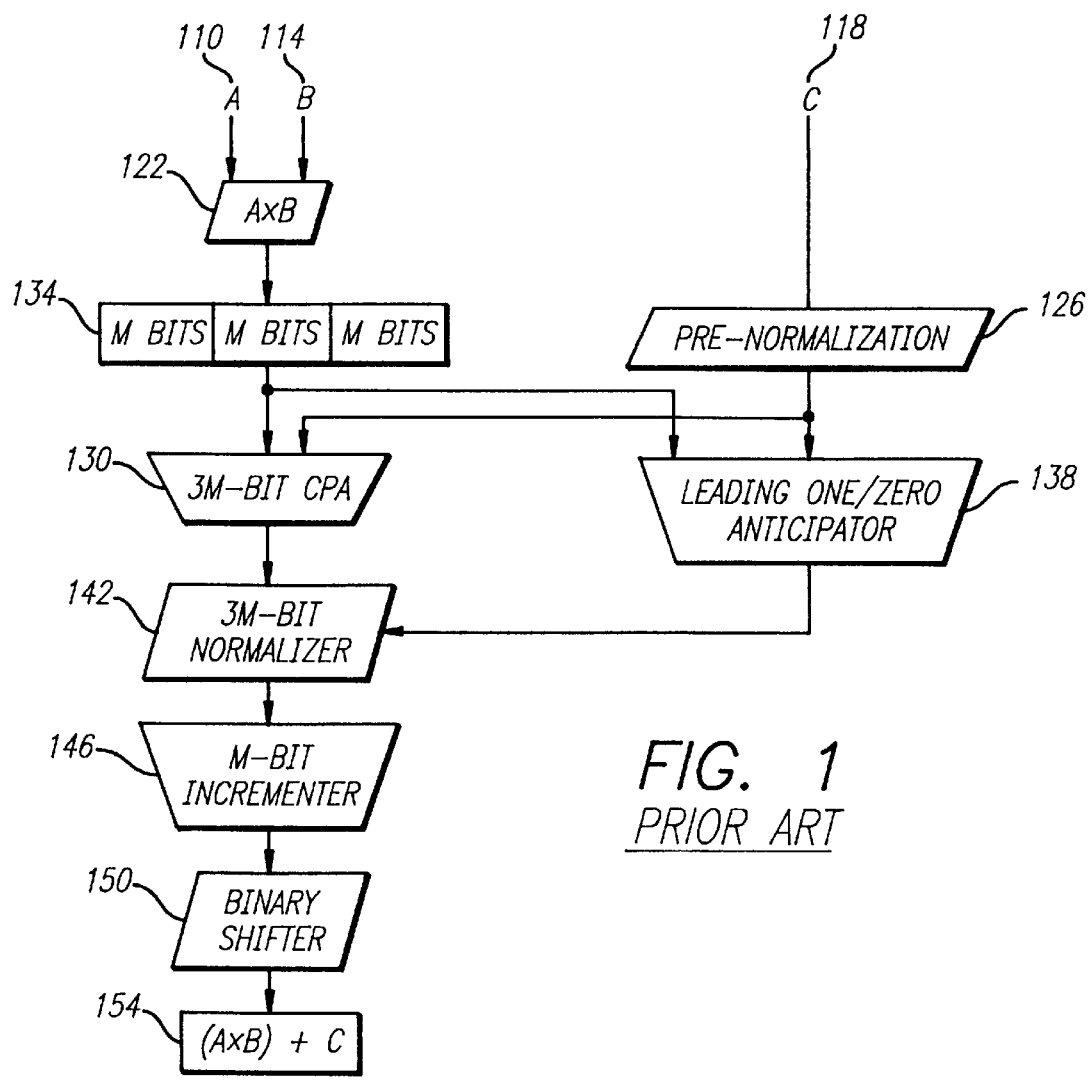
FIG. 1 is a flow chart of a prior art floating-point multiplication and accumulation unit.
Figure 2:
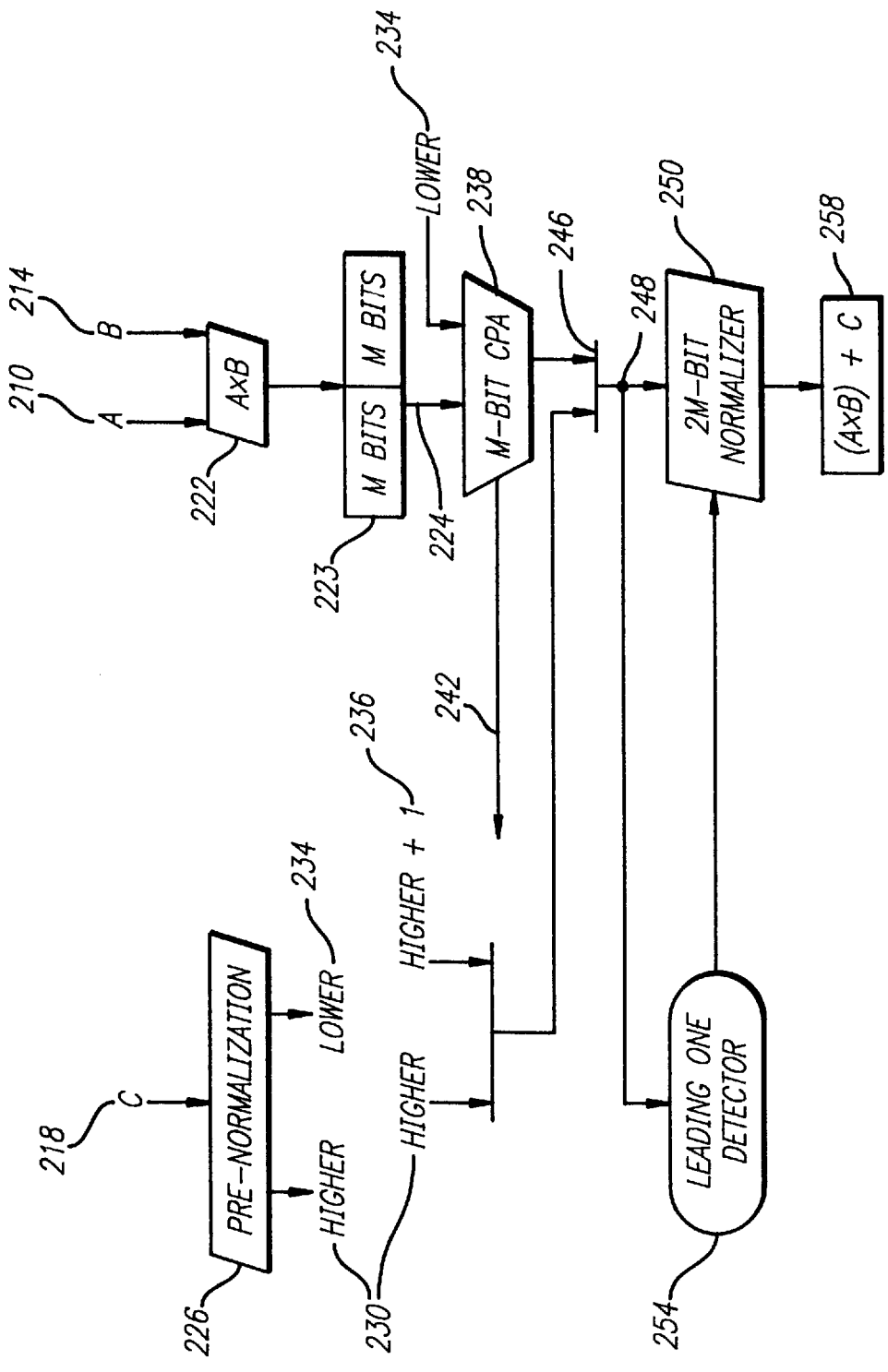
FIG. 2 is a flow chart showing the execution of a floating-point multiplication and accumulation unit, according to one preferred embodiment of the present ivention.
Figure 3:
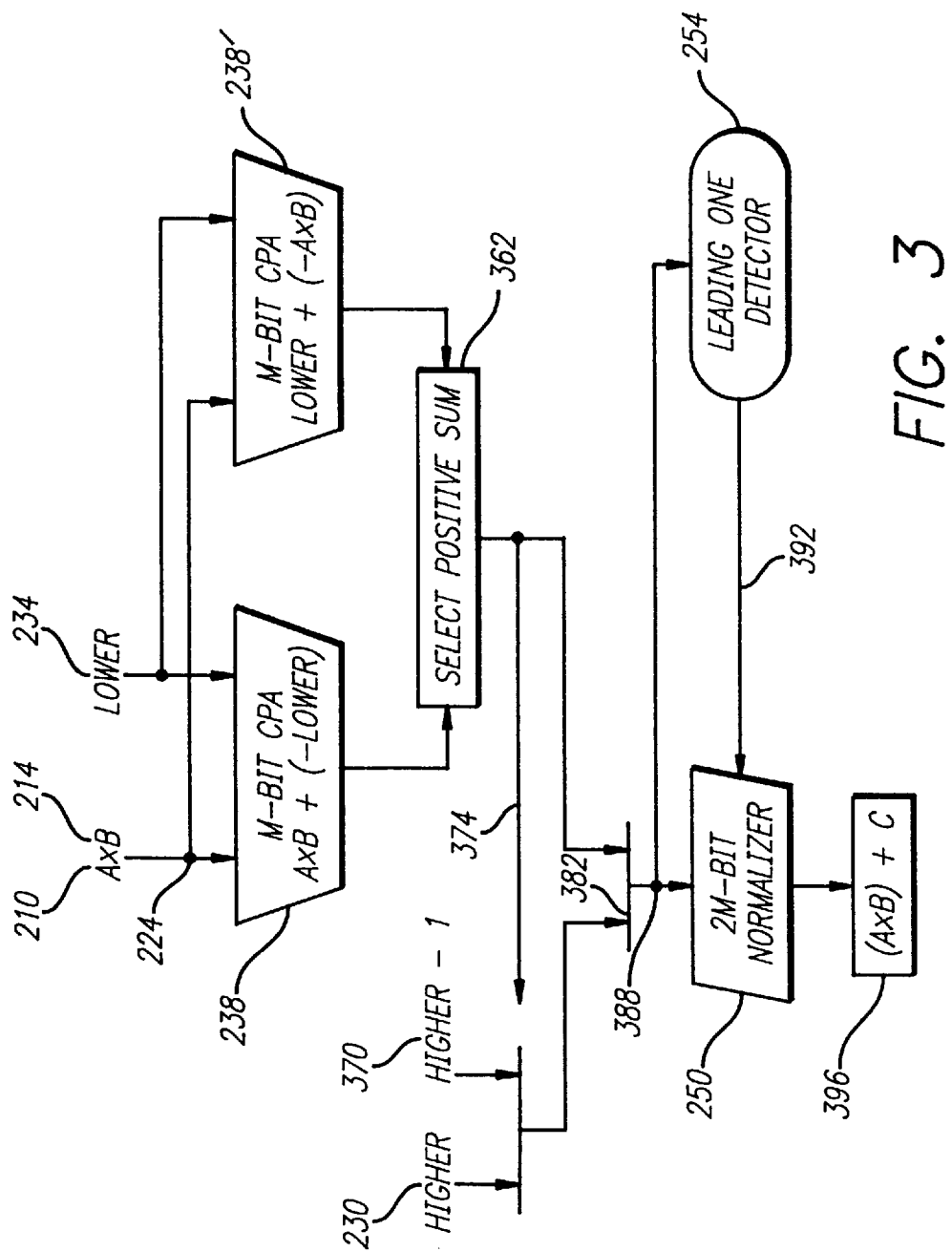
FIG. 3 is a flow chart of a preferred embodiment of a floating-point multiplication and accumulation unit, when a product of a multiplication is opposite in sign to a number added to the product, according to a preferred embodiment of the present invention.

FIG. 2 illustrates a presently preferred fmac for executing the operations, (A×B)+C. As in FIG. 1, A 210, B 214 and C 218 preferably are binary floating-point numbers. For illustration purposes only, A 210, B 214 and C 218 each have an m-bit mantissa. A 210, B 214 and C 218 are floating-point numbers in IEEE format, preferably single precision. Single precision is preferred, because it requires less hardware to implement. Although, in another embodiment, A 210, B 214 and C 218 are double precision floating-point numbers in IEEE format. This fmac is implemented in a floating-point unit of a microprocessor. As will be explained below, this preferred embodiment only uses an m-bit carry propagation adder (CPA) instead of a 3 m-bit CPA 142, as does the prior art design discussed above. An example of a CPA is a ripple-carry adder, also known as a serial adder. Moreover, this embodiment uses a leading one detector 254 as opposed to a leading one/zero anticipator. FIG. 2 illustrates the preferred embodiment for the case when the product of A 210 and B 214 has the same sign as C 218. If the product of A 210 and B 214, as well as C 218 are negative quantities, then the preferred embodiment of FIG. 2 still treats all of the numbers as if they were positive, and then appends the appropriate sign to the final result, as later explained in more detail. FIG. 3, discussed further below, illustrates the case when the product of A 210 and B 214 is opposite in sign to C 218.

In FIG. 2, the multiplication of A 210 and B 214 is accomplished with a multiplication array 222. The result of the multiplication of A 210 and B 214 comprises a 2-m-bit mantissa 223. In parallel (i.e., preferably occurring substantially at the same time) with the multiplication of A 210 and B 214, the number C 218 is pre-normalized 226 to align C's 218 exponent with an exponent of the product of A 210 and B 214.

The pre-normalization 226 of C 218 generally requires less time than the multiplication of A 210 and B 214, which typically involves repeated additions. Taking advantage of this difference in execution time, once the pre-normalization 226 of C 218 is complete (and typically the multiplication of A 210 and B 214 is still proceeding), the mantissa of the pre-normalized C 218 is divided into a higher part 230 and a lower part 234. The higher part 230 comprises all bits of the mantissa of C 218 of higher significance than the 2 m-bits 223 of the product of A 210 and B 214. The lower part 234 comprises any bits of pre-normalized C's 218 mantissa with significance equal to and less than the most significant bit of the product of the multiplication of A 210 and B 214, but at least as significant as the least significant bit of the product of A and B. Any bits of the lower part 234 of less significance than the least significant bit of the product of A 210 and B 214 are represented by one sticky bit.

During an addition of the product of A 210 and B 214 to the lower part 234, as described further below, this fmac actually creates another higher part 236 of C's 218 mantissa. (Of course, this higher part 236 could be computed earlier, for example, during the multiplication 222.) This alternate higher part 236 equals the original higher part 230 plus one, i.e. incremented by one. In other words, to generate the alternate higher part 236, this fmac adds a one to the least significant bit position of the original higher part 230. The reason for creating the alternate higher part 236 is that when ultimately adding the product of A 210 and B 214 to the pre-normalized C 218, there may be a carry from the sum of the lower part 234 and the product of A 210 and B 214 to the higher part 230. The combination of the higher part 230 or 236 with the mantissa of the product of A 210 and B 214 has the potential of being a 3 m-bit mantissa, i.e a mantissa with 3 m-bit significant bits. But, as discussed below, this preferred embodiment obviates the need for dealing with the 3 m-bit mantissa as a whole, thereby significantly speeding up the processing of this fmac over that achieved by the prior art design, discussed above.

Once the multiplication of A 210 and B 214 is complete, the product of A 210 and B 214 preferably is rounded 224 by truncating from the 2 m-bit mantissa 223 the m least significant bits. Of course other methods of rounding can be used as well, such as rounding 224 up to the next significant bit. The truncated 224 product of A 210 and B 214 is a floating-point number with an m-bit mantissa which is then added to the lower part 234 of the pre-normalized C 218. Preferably, this addition is performed using an m-bit CPA 238 (carry propagation adder) instead of a 3 m-bit CPA 130, as in the prior art design of FIG. 1. (In an alternative embodiment, the 2 m-bit product 223 of A 210 and B 214, is not truncated 224. So, a 2 m-bit CPA is used in place of the m-bit CPA 238.) Besides ripple-carry adders, there are other types of adders, such as carry-lookahead adders and a carry-skip adders, which may be suitable for use with the present embodiment.

Using an m-bit CPA 238 instead of a 3 m-bit CPA 130, as in the prior art design, reduces significantly the hardware required to implement this fmac of this preferred embodiment. In addition, using an m-bit CPA 238 instead of a 3 m-bit CPA, also significantly increases the speed with which the result of the addition is available, since the time for computing a sum is dominated by the bit width of the mantissas' of the numbers added. To illustrate, using an m-bit carry skip adder 238, which is a type of a carry propagation adder, instead of a 3 m-bit carry-skip adder 130 reduces the hardware for implementing the carry-skip adder by about one third and increases the speed of addition roughly by the square root of 3, i.e., by about 1.7. Use of an m-bit instead of a 3 m-bit ripple-carry adder also reduces the hardware by one third, and increases the speed of addition by a factor of three.

A purpose of adding the truncated 224 mantissa of the product of A 210 and B 214, to the lower part 234 of C 218 is to determine whether a carry is generated out of this sum. When a carry is generated, then a one is added to the higher part 230 of pre-normalized C 218, i.e. the pre-normalized C 218 is incremented by one. However, in the preferred embodiment, instead of actually adding a one, the alternate higher part 236 is selected 242. As will become clear below, the capability of simply selecting the alternate higher part 236 means that, at this stage, this fmac need not spend time doing an addition. When the m-bit CPA 238 does not generate a carry out of the sum, then this fmac selects 242 the original higher part 230.

From the m-bit addition 238 and the selection 242 of the appropriate higher part 230 or 236, this fmac in this embodiment assembles a 2 m bit mantissa floating-point number 248 by concatenating 246 the higher part 230 or 236 with the output of CPA 238. This floating-point number is stored in a 2 m-bit register 428 (see FIGS. 4a, 4b and 4c). The m most significant bits of the 2 m-bit register 428 comprise the selected 242 higher part 230 or 236. When the higher part 230 or 236 comprises less than m bits, for example m-x bits, then the x most significant bits of the 2 m-bit register are assigned a value of zero. The m least significant bits of the 2 m-bit register comprise the output of the m-bit CPA 238. Next, preferably, a 2 m-bit normalizer 250 normalizes the 2 m-bit mantissa floating-point number 248. Preferably, the 2 m-bit normalizer 250 rounds the 2 m-bit number 246 by discarding all but the m-most significant bits starting with the most significant one. Preferably, a leading one detection 254 is executed on the 2 m-bit number 246. The leading one detection determines the exact location of the most significant one bit of the 2 m-bit mantissa of the number 246. The output of the 2 m-bit normalizer 250 is the result of the operations (A×B)+C 258. When the A×B value and C 258 are negative quantities, a negative sign is appended to the result of (A×B)+C 258.

Because, in this embodiment, this fmac uses a leading one detector 254 (as opposed to a leading one anticipator), a binary shifter 150, as in FIG. 1, is unnecessary. The reason is that the leading one detection 254 is a process for determining the exact location of the most significant one bit. Unlike the anticipator 138, the leading one detector 254 operates on a bit string that is already in existence, i.e., the 2 m-bit mantissa floating-point number 248. The leading one anticipator 138 merely predicts the leading one bit position with a possible error of one position, as discussed in the context of FIG. 1. In the prior art design, the binary shifter 150 is used to correct that possible error.

The present preferred embodiment has numerous advantages over the prior art of FIG. 1. For example, implementing the leading one detector 254 requires significantly less hardware than implementing a leading one prediction. Furthermore, leading one detectors 254 are significantly faster than leading one/zero anticipators 138. Similarly, the fact that the normalization 250 is executed on a 2 m-bit mantissa as opposed to a 3 m-bit mantissa as in FIG. 1, means that the normalizer 250 is less hardware intensive and faster than the normalizer 142.

FIG. 3 illustrates a preferred embodiment of an fmac, when the product of A 210 and B 214 is opposite in sign to C 218 in the operations (A×B)+C. For example, A×B can be a positive quantity, whereas C 218 may be negative. (For simplicity, FIG. 3 does not show the pre-normalization of C 218, the dividing of the mantissa of the pre-normalized C 218 into a higher part 230 and a lower part 234. Also not shown is the multiplication of A 210 and B 214. These steps are accomplished in the same manner and with similar hardware, as explained in the discussion of FIG. 2.) FIG. 3 is similar to FIG. 2, except that for handling of opposite signs, preferably a second m-bit CPA 238' is added in parallel to the original m-bit CPA 238. Regardless of which of the numbers A 210, B 214, C 218 is negative, the m-bit CPA's 238 and 238' compute the following two quantities: (A×B)+(−lower part 234 of C 218), lower part 234 of C 218+(−A×B), respectively. Preferably, a negative number is represented in the twos complement form, but, for instance, a ones complement form can be used as well. (In another embodiment, these two additions are handled by a single m-bit CPA, which stores the two results in separate registers.) In words, the quantity [(A×B)+(−lower part 234)] expresses that this fmac adds the twos complement of the lower part 234 of the pre-normalized 226 mantissa of C 218 to the truncated 224 mantissa of the product A×B. The quantity [lower part 234+(−A×B)] expresses that this fmac adds the twos complement of the truncated 224 mantissa of the product A×B to the lower part 234 of the pre-normalized 226 mantissa of C 218.

In FIG. 3, adding a second adder 238' is practical because FIG. 3 involves computing a negative number with an m-bit mantissa, as opposed to a 3 m-bit mantissa, which adder 130 in FIG. 1 has to contend with. As already mentioned, a CPA for adding m-bit mantissas contains significantly less hardware than the CPA for adding 3 m-bit mantissas.

Following these additions, this fmac looks for the sign bit of the result of these additions to determine which of the results is a positive number. In the twos complement representation, the left most bit is the sign bit. When a sum has a sign bit equal to a "one," then the sum is negative. When a sum has a sign bit equal to a "zero," then the sum is positive. In step 362, this fmac chooses the positive sum from the two sums. This obviates the need for later having to take a twos complement of a negative number, as will be discussed in greater detail below.

This fmac takes advantage of the fact that additions are relatively time consuming. While the adders 238 and 238' are processing their respective additions this fmac computes a higher part of C less one 370. In another embodiment, the higher part less one 370 is computed even sooner, e.g., during the multiplication 222 of A 210 and B 214. The higher part of C less one 370 comprises the higher part 230, as defined in the context of FIG. 2, but decremented by one. For example, if the higher part 230 equals the binary number "1000," then the higher part of C less one 370 equals the binary number "0111."

This fmac selects 374 from the choice of two higher parts 230 and 370 according to the following rule. If the truncated 224 mantissa of the product A×B is greater than the lower part 234, then this fmac selects 374 the higher part less one 370 of the mantissa of C 218. If the truncated 224 mantissa of the product A×B is less than or equal to the lower part 234, then this fmac selects 374 the higher part 230 of the mantissa of C 218.

Next, this fmac concatenates 382 the selected 374 higher part 230 or 370 with the selected sum 362 of the additions of the two adders 238 and 238'. The result of the concatenating 382 is a 2 m-bit mantissa 388, with the higher part 230 or 370 occupying up to m of the most significant bit positions and the selected sum 362 occupying the m least significant positions.

The 2 m-bit mantissa 388 preferably is never in the twos complement form, even if, as mentioned above, for example, A×B is a positive quantity and C 218 is negative and has an absolute value greater than A×B. It does not have to be, because of the selection of the positive sum 362, and the combination of the sum 362 with the appropriate upper part 230 or 370, which also is not in the twos complement form. However, the sign of the overall result of the operations (A×B)+C, will, in this example, be negative. This fmac knows the sign of the overall result from the fact that there exists a higher part 230, 236, or 370. This fmac appends the proper sign to the overall result of the operations (A×B)+C.

Next, similarly, as in FIG. 2, a normalizer 250 normalizes the 2 m-bit mantissa 388 per the output 392 of a leading one detector 254. This fmac can use a leading one detector 254 instead of having to rely on a leading one/zero anticipator 138. No predictions 138 of the leading one are necessary, because by the time the most significant one bit has to be found in the mantissa 388, its m most significant bits will not change as a result of a continued calculation, such as an addition by the CPA 130 in FIG. 1. Moreover, predicting a leading zero 138 is unnecessary, because the mantissa 388 is always positive. The fact that the mantissa 388 is always positive means that there is no need for taking the twos complement of the mantissa 388. Therefore, in FIG. 3, as in FIG. 2, there is no need for the m-bit incrementer 146 of FIG. 1. The output of the normalizer 250 is the result 396 of the operations (A×B)+C. The total fmac execution time in FIGS. 2 and 3 is approximated by the operation times of the following: (m-bit×m-bit multiplication)+(m-bit addition)+(leading one detection)+(2 m-bit normalization).

Figure 4B:
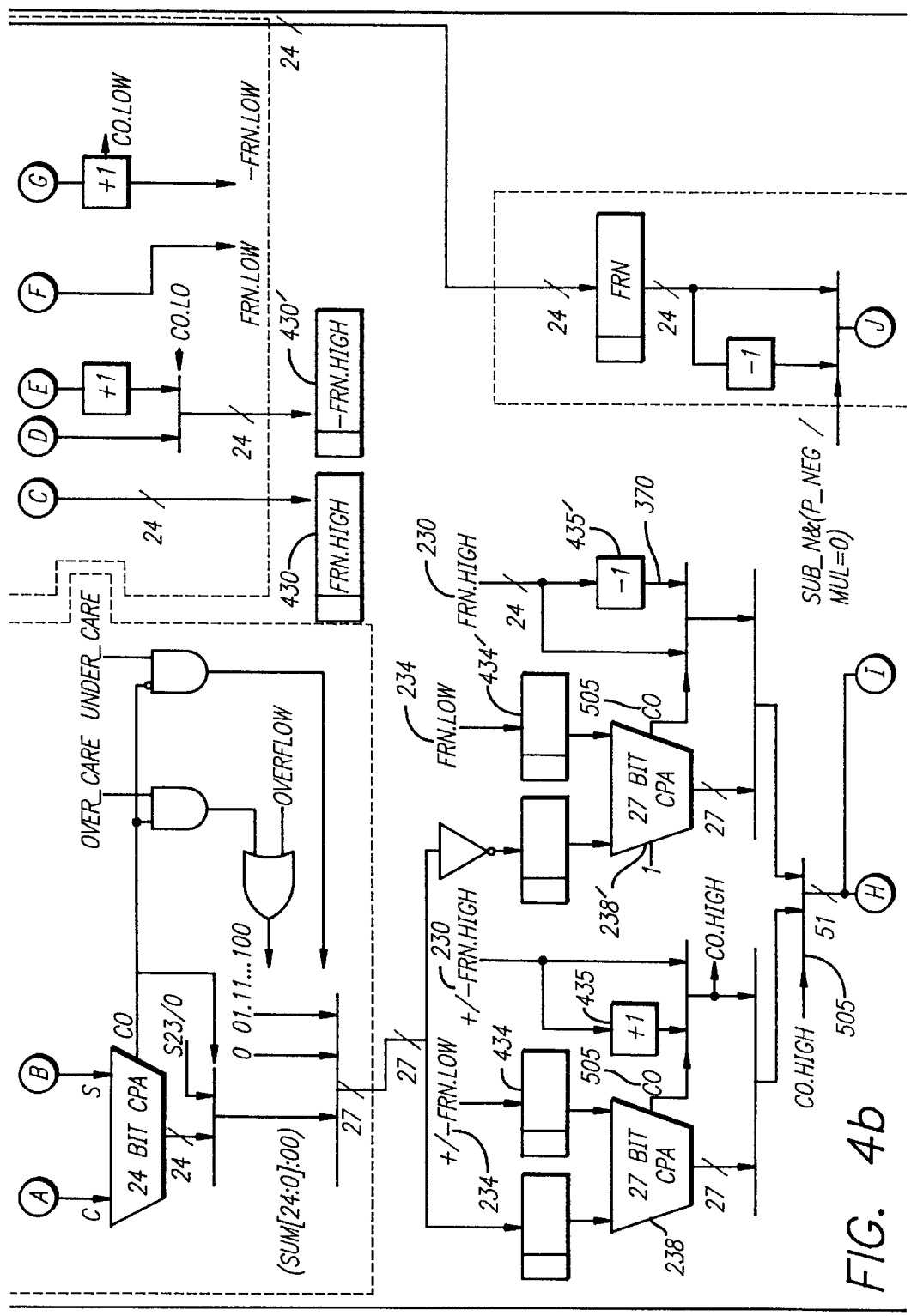

Preferably, FIGS. 2 and 3 are combined into a comprehensive fmac. FIGS. 4a, 4b & 4c illustrate this embodiment. FIGS. 4a & b illustrate an fmac 400, which is a part of a floating-point unit. Within the fmac 400, in FIG. 4a, a multiplication unit 422 multiplies the floating-point numbers A 210 and B 214, which are stored in registers 410 and 414, respectively. Another register 418 is for storing the floating-point number C 218. (Although, this discussion is in terms of registers, it will be clear to one of ordinary skill in the art that other types of memory can be used, wherein data can be stored differently than described here. Of course, individual registers can be part of a single memory.) A pre-normalizer 426 pre-normalizes 226 C 218 and divides the mantissa of C 218 into the higher part 230 and into the lower part 234. In FIG. 4b, adder 238 adds the lower part 234 of C 218 to the product of A 210 and B 214. Preferably, adder 238 also adds, as in FIG. 3, the product of A 210 and B 214 to the twos complement of C 218. Adder 238' adds, as in FIG. 3, the lower part 234 of C 218 to the twos complement of the product of A 210 and B 214. The lower part 234 is stored in registers 434 and 434', prior to being input into adders 238 and 238', respectively.

Figure 5:
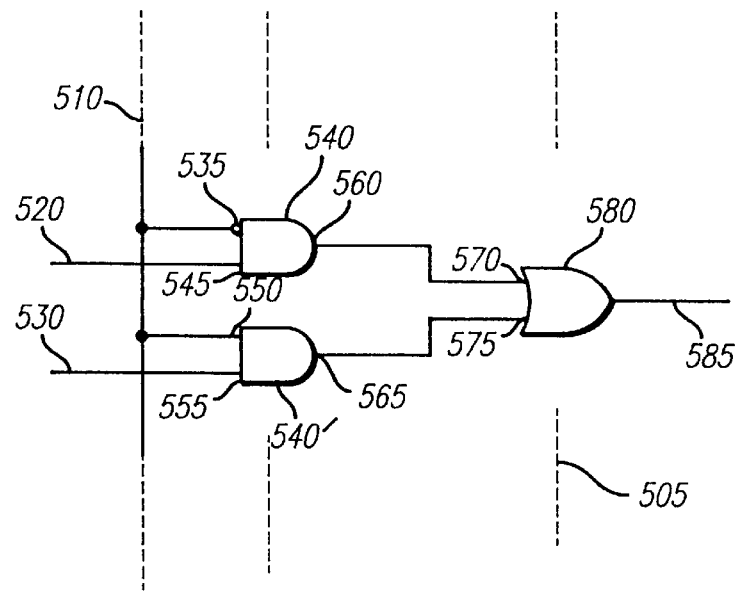
FIG. 5 is a selector circuit for selecting a positive sum of a product and a lower part of a number, according to a presently preferred embodiment.

When both adders 238 and 238' are used, as in FIG. 3, the positive sum is selected 362 with a selector circuit 505, as shown in FIG. 5. The selector circuit 505 accepts three inputs: the sum of adder 238, the sum of adder 238', and a sign bit 510 of the sum of adder 238. The sign bit 510 can have either of two values. Per the twos complement format, when the sign bit 510 has a value of one, then the sum of adder 238 is negative. A sign bit 510 value of zero indicates that this sum is positive. For simplicity, FIG. 5 only illustrates the selection of individual bits of the sums generated by adders 238 and 238'. The complete selector circuit 505 comprises the circuit shown in FIG. 5 and duplicated for each bit of the sums produced by adders 238 and 238', as indicated by the dashed lines. In FIG. 5, there are actually shown only three inputs: as already mentioned, the value of the sign bit 510 of the sum generated by adder 238, a sum bit 520 generated by adder 238 and a sum bit 530 generate by adder 238'. The sum bits 520 and 530 are of equal significance. The sign bit value 510 is electrically coupled to an inverted input terminal 535 of a logic AND gate 540. The sum bit 520 is electrically coupled to another input 545 of the AND gate 540. The sign bit 510 also is electrically coupled to an input 550 of another logic AND gate 540'. The sum bit 530 is electrically coupled to another input 555 of the AND gate 540'. AND gates 540 and 540' have outputs 560 and 565, respectively. Outputs 560 and 565 are coupled to inputs 570 and 575, respectively, of a logic OR gate 580. The OR gate 580 has an output 585.

The part of the selector circuit 505 shown in FIG. 5 provides at its output 585 either the sum bit 520 or the sum bit 530 depending on the value of the sign bit 510. When the sign bit 510 equals "one," then the sum bit 530 is selected, because only AND gate 540' is enabled. Indeed, the sum bit 530 should be selected, because a sign bit 510 of value one for the sum of adder 238 implies that the absolute value of the product of A 210 and B 214 is smaller than the absolute value of the lower part 234 of C 218. As discussed above, preferably the positive sum is selected 362, of which sum bit 530 is a part, when the value of the sign bit equals one. Similarly, when the sign bit 510 has a value of zero, then due to the action of the inverted input 535, the sum bit 520 is available at the output 585. For the case when only the single adder 238 is used, as in FIG. 2, adder 238' is disabled by a disable signal.

Continuing with FIGS. 4a & 4b, the higher part 230 is stored in register 430. Its twos complement is stored in register 430' for pipelining of execution cycles of which there are two. (The first cycle starts at the level of registers 410, 414, and 418, in FIG. 4a. The second cycle starts at the level of the 434 and 434' registers, in FIG. 4b.) A carry-skip adder 435, in FIG. 4b, adds one to the higher part 230 stored in register 430 to generate the higher part plus one 236. Similarly, another carry-skip adder 435' subtracts a one from the higher part 230 to generate the higher part less one 370.

Of course, other types of carry propagation adders, such as those mentioned above, can be used in place of the carry-skip adders 435 and/or 435'. The alternate higher parts 236 and 370 are stored in their respective adders 435 and 435' until selected 242 and 374, respectively.

Selection of these alternate higher parts 230 and 370 is accomplished with selector circuits 505, as indicated in FIG. 4b. When selecting 242 the higher part plus one 236, the carry data bit generated by adder 238 replaces the sign bit 510, the higher part 230 replaces the sum bits 520, and the higher part plus one 236 replaces the sum bits 530. When selecting 374 the higher part less one 370, the selector circuit 505 is used similarly, except that a carry bit generated by adder 238' instead of 238 replaces the sign bit 510, (the higher part 230 still is applied at 520) and the higher part less one 370 is applied at 530.

A 2 m-bit register 428 stores the concatenation 246 (see FIG. 2) or 382 (see FIG. 3) of the higher part 230, 236, or 370 and the output of the adder 238 or 238', as selected by the selector circuit 505. Concatenating 246 or 382 is accomplished in FIGS. 4b & 4c by storing the higher part 230, 236, or 370 in the most significant half of register 428's bit positions and storing the output of the adder 238 or 238' in the least significant half of register 428's bit positions. A leading one detector 254 determines the location of the most significant bit in the register 428, such that a bit shifter 450 can perform the function of the normalizer 250 of FIGS. 2 and 3. A register 455 stores the location of the most significant bit.

Several preferred embodiments of the present invention have been described. Nevertheless, it will be understood that various modifications may be made without departing from the spirit and scope of the invention. For example, the discussion above has been in terms of higher and lower parts 230, 234. However, there are other possibilities. For example, when following pre-normalization 226 of C 218, there are no bits of significance as high as the least significant bit of the product of A 210 and B 214. Following the rounding 224, this allows bypassing of the remaining steps in FIGS. 2 and 3. Then the rounded 224 product of A 210 and B 214 is the result of the operations of (A×B)+C. Similarly, the absolute value of C 218 can be much greater than that of the product of A 210 and B 214, such that following pre-normalization 226 of C 218, the most significant bit of the product of A 210 and B 214 is less significant than the least significant bit of C 218. Then, computations involving A 210 and B 214 are bypassed, as illustrated by a selector circuit 465 in FIG. 4c. It also will be clear to a person knowledgeable in the art, based upon the foregoing discussion, how this embodiment performs for other possible permutations of the magnitudes and signs and mantissa widths of A 210, B 214 and C 218. Furthermore, the numbers A 210, B 214, and C 218 need not be floating-point numbers, but can simply be integers. Indeed, these numbers need not even be binary, but also could be numbers with different bases, such as octal and hexadecimal. Thus, the present invention is not limited to the preferred embodiments described herein, but may be altered in a variety of ways, which will be apparent to persons skilled in the art.

What is claimed is:

1. A process for operating on a first number stored in memory and for operating on a second number stored in the memory, the process comprising the steps of:

providing a pre-normalizer to divide the second number into a first higher part and into a lower part;

providing a first adder to operate on the lower part and on the first number to generate a first result;

providing a device to combine in the memory the first higher part with the first result to produce a second result;

wherein the first adder subtracts the lower part from the first number to generate a first difference and also generates a sign data bit having a first and a second values in accordance with a sign of the first difference;

providing a second adder to subtract the first number from the lower part to generate a second difference;

providing a selector to select the first difference to represent the first result, when the sign data bit has the first value, and wherein the selector selects the second difference to represent the first result, when the sign data bit has the second value.

2. An apparatus for operating on a first number stored in a memory and for operating on a second number stored in the memory, the apparatus comprising:

a first device for storing a first higher part of the second number;

a second device for storing a lower part of the second number;

a first adder coupled to the second device, the first adder for operating on the lower part of the second number and on the first number to generate a first difference;

a third device coupled to the first adder and to the first device, the third device for combining the first higher part with the first difference to produce a second result, a second adder for subtracting the first number from the lower part to generate a second difference and for assigning a value to a sign data bit; and a selector circuit for selecting the first difference, when the sign data bit equals a first value and for selecting the second difference, when the sign data bit equals a second value, the selector circuit coupled to the second adder.

3. A process comprising the steps of:

using a pre-normalizer to divide a first number into a higher part and a lower part;

using a first adder to subtract the lower part from a second number to generate a first difference and to generate a sign data bit indicating a sign of the first difference;

using a second adder to subtract the second number from the lower part to generate a second difference;

using a selector to select the first difference as the selected difference to represent the first result when the sign data bit has the first value;

using the selector to select the second difference as the selected difference to represent the first result when the sign data bit has the second value; and using a device to combine the higher part and the selected difference to produce a second result.

4. A system comprising:

a pre-normalizer for dividing a first number into a higher part and a lower part;

a first adder coupled to the pre-normalizer for subtracting the lower part from a second number to generate a first difference and to generate a sign data bit indicating a sign of the first difference;

a second adder coupled to the pre-normalizer for subtracting the second number from the lower part to generate a second difference;

a selector coupled to the first adder and to the second adder for selecting the first difference as the selected difference to represent the first result when the sign data bit has the fist value and the second difference as the selected difference to represent the first result when the sign data bit has the second value; and a device coupled to the selector for combining the higher part and the selected difference to produce a result.

* * * * *

UNITED STATES PATENT AND TRADEMARK OFFICE
CERTIFICATE OF CORRECTION

PATENT NO. : 5,867,413
DATED : February 2, 1999
INVENTOR(S) : Hsueh-Li Joseph Yeh It is certified that error appears in the above-identified patent and that said Letters Patent is hereby corrected as shown below:

Column 11, line 2, should read --bit has the first value-- instead of "bit has the fist value"

Signed and Sealed this

Third Day of August, 1999

Attest:

Q. TODD DICKINSON

*Attesting Officer*   *Acting Commissioner of Patents and Trademarks*